(12) United States Patent
Rugolo et al.

(10) Patent No.: US 10,861,228 B2
(45) Date of Patent: Dec. 8, 2020

(54) OPTICAL OTOSCOPE DEVICE

(71) Applicant: X Development LLC, Mountain View, CA (US)

(72) Inventors: Jason Rugolo, Mountain View, CA (US); Bin Ni, Fremont, CA (US); Daniel George, Urbana, IL (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/235,092

(22) Filed: Dec. 28, 2018

(65) Prior Publication Data

US 2020/0211277 A1  Jul. 2, 2020

(51) Int. Cl.
| | |
|---|---|
| *G06T 15/00* | (2011.01) |
| *G06T 17/05* | (2011.01) |
| *G06N 3/08* | (2006.01) |
| *G06N 20/00* | (2019.01) |

(52) U.S. Cl.
CPC .............. *G06T 17/05* (2013.01); *G06N 3/08* (2013.01); *G06N 20/00* (2019.01)

(58) Field of Classification Search
CPC .. G06T 3/40; G06K 9/00362; G06K 9/00536; G06K 9/00523; G06N 3/08; G06N 20/00
USPC .......................................................... 345/418
See application file for complete search history.

(56) References Cited

U.S. PATENT DOCUMENTS

| | | | | |
|---|---|---|---|---|
| 7,149,320 B2* | 12/2006 | Haykin | ................. | H04R 25/407 381/320 |
| 8,032,337 B2* | 10/2011 | Deichmann | ............. | A61F 11/08 703/1 |
| 8,332,061 B2 | 12/2012 | Baloch et al. | | |
| 8,535,236 B2* | 9/2013 | Heinz | ....................... | G10H 1/00 381/312 |
| 9,174,383 B2 | 11/2015 | Simons | | |
| 9,836,883 B2* | 12/2017 | Tran | ...................... | B29C 64/386 |
| 10,157,503 B2* | 12/2018 | Tran | ........................ | B33Y 80/00 |
| 10,325,183 B2* | 6/2019 | Swaminathan | ........ | G06K 9/627 |
| 10,423,823 B1* | 9/2019 | Sarkar | ................ | G06K 9/00523 |
| 10,674,918 B2* | 6/2020 | Godavarty | ........... | A61B 5/0071 |
| 2006/0276709 A1 | 12/2006 | Khamene et al. | | |
| 2015/0161459 A1 | 6/2015 | Boczek | | |

(Continued)

FOREIGN PATENT DOCUMENTS

| | | |
|---|---|---|
| CN | 106683550 A | 5/2017 |
| CN | 108596193 A | 9/2018 |
| JP | 2018195309 A | 12/2018 |

OTHER PUBLICATIONS

Qi CR, Yi L, Su H, Guibas LJ. Pointnet++: Deep hierarchical feature learning on point sets in a metric space. InAdvances in neural information processing systems 2017 (pp. 5099-5108).*

(Continued)

*Primary Examiner* — Phu K Nguyen
(74) *Attorney, Agent, or Firm* — Christensen O'Connor Johnson Kindness PLLC

(57) ABSTRACT

A system to optically measure an ear includes a controller with logic that when executed by the controller causes the system to perform operations. Operations may include capturing the one or more images of the ear using the one or more image sensors, and generating image data from the one or more images. 3D keypoints of the ear are calculated from the image data, and a 3D model of the ear is generated using the 3D keypoints.

23 Claims, 4 Drawing Sheets

(56) References Cited

U.S. PATENT DOCUMENTS

| | | | |
|---|---|---|---|
| 2015/0382123 A1 | 12/2015 | Jobani | |
| 2016/0040978 A1 | 2/2016 | Boppart et al. | |
| 2017/0287212 A1* | 10/2017 | Tran | B29C 64/386 |
| 2018/0255622 A1* | 9/2018 | Spero | F21V 23/0478 |
| 2019/0014431 A1* | 1/2019 | Lee | H04R 3/00 |
| 2019/0286891 A1* | 9/2019 | Sarkar | G06K 9/00771 |

OTHER PUBLICATIONS

EmersicŽ, Struc V, Peer P. Ear recognition: More than a survey. Neurocomputing. Sep. 13, 2017;255:26-39.*

EmersicŽ, Stepec D, Struc V, Peer P, George A, Ahmad A, Omar E, Boult TE, Safdaii R, Zhou Y, Zafeiriou S. The unconstrained ear recognition challenge. In2017 IEEE international joint conference on biometrics (IJCB) Oct. 1, 2017 (pp. 715-724). IEEE.*

Liu H, Yan J. Multi-view ear shape feature extraction and reconstruction. In2007 Third International IEEE Conference on Signal-Image Technologies and Internet-Based System Dec. 16, 2007 (pp. 652-658). IEEE.*

EmersicŽ, Gabriel LL, Struc V, Peer P. Convolutional encoder-decoder networks for pixel-wise ear detection and segmentation. IET Biometrics. Feb. 9, 2018;7(3):175-84.*

Ge W, Yu Y. Borrowing Treasures from the Wealthy: Deep Transfer Learning through Selective Joint Fine-Tuning. In2017 IEEE Conference on Computer Vision and Pattern Recognition (CVPR) Jul. 21, 2017 (pp. 10-19). IEEE.*

Kornblith S, Shlens J, Le QV. Do Better ImageNet Models Transfer Better?. arXiv preprint arXiv:1805.08974. May 23, 2018.*

U.S. Appl. No. 16/234,999, Tympanic Membrane Measurement, filed Dec. 28, 2018, 31 pages.

Suwajanakorn et al., "Discovering of Latent 3D Keypoints via End-to-end Geometric Reasoning," 14 pages.

U.S. Appl. No. 16/235,360, Transparent Sound Device, filed Dec. 28, 2018, 29 pages.

U.S. Appl. No. 16/235,417, Open-Canal In-Ear Device, filed Dec. 28, 2018, 23 pages.

U.S. Appl. No. 16/176,660, Modular In-Ear Device, filed Oct. 31, 2018, 30 pages.

International Search Report and Written Opinion, dated Mar. 18, 2020 in corresponding International Patent Application No. PCT/US2019/062690, 10 pages.

* cited by examiner

OPTICAL OTOSCOPE DEVICE

TECHNICAL FIELD

This disclosure relates generally to otoscopes.

BACKGROUND INFORMATION

Headphones are a pair of loudspeakers worn on or around a user's ears. Circumaural headphones use a band on the top of the user's head to hold the speakers in place over or in the user's ears. Another type of headphones are known as earbuds or earpieces and consist of individual monolithic units that plug into the user's ear canal.

Both headphones and ear buds are becoming more common with increased use of personal electronic devices. For example, people use headphones to connect to their phones to play music, listen to podcasts, etc. However, often times these devices become uncomfortable with extended wear. Specifically, extended wear of in-ear devices, like earbuds, that are not custom fit to the user, may result in the user developing "hot spots" (points of irritation due to rubbing). Further, mass-produced devices may easily fall out of the ear, or become dislodged, due to the variance in the shape of ears of the individual users.

Currently custom headphones are possible with complex molding techniques that involve injecting foaming agents into the user's ear to make a reverse mold. This is a time consuming and unpleasant process, where the user must go into a professional facility in order to have the procedure performed. Additionally, there may be risk of injuring the individual, or other complications, while performing the foam injection process. Accordingly, other noninvasive techniques to measure the ear are desirable to develop custom consumer electronics.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for an optical otoscope device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

High resolution 3D scans of the tympanic membrane, ear canal, and pinna may be useful for otology, otolaryngology, and audiology, as well as developing custom in ear monitors with extreme levels of noise occlusion for high fidelity audio ear interfaces, or extreme noise occlusion for safety in loud operating environments. Generally, embodiments herein describe ear scanning using a personal electronic device (e.g., a phone) and optionally a peripheral device (connected by USB-C or another standard smartphone I/O (e.g. Bluetooth)), which incorporates cutting edge 3D scanning methodologies, including but not limited to structured light with lasers or an RGB-IR dot projection mapping technique. These optical devices may be incorporated into the tip of a wand to see inside of the user's ear.

The software app that computes a precise ear scan then develops a standard 3D file (e.g., STL, OBJ files), that can be used to print bespoke-fitting ear devices or to build 3D models of the ear for medical or diagnostic purposes.

The following disclosure describes the embodiments discussed above, and other embodiments, as they relate to the figures.

Figure 1:
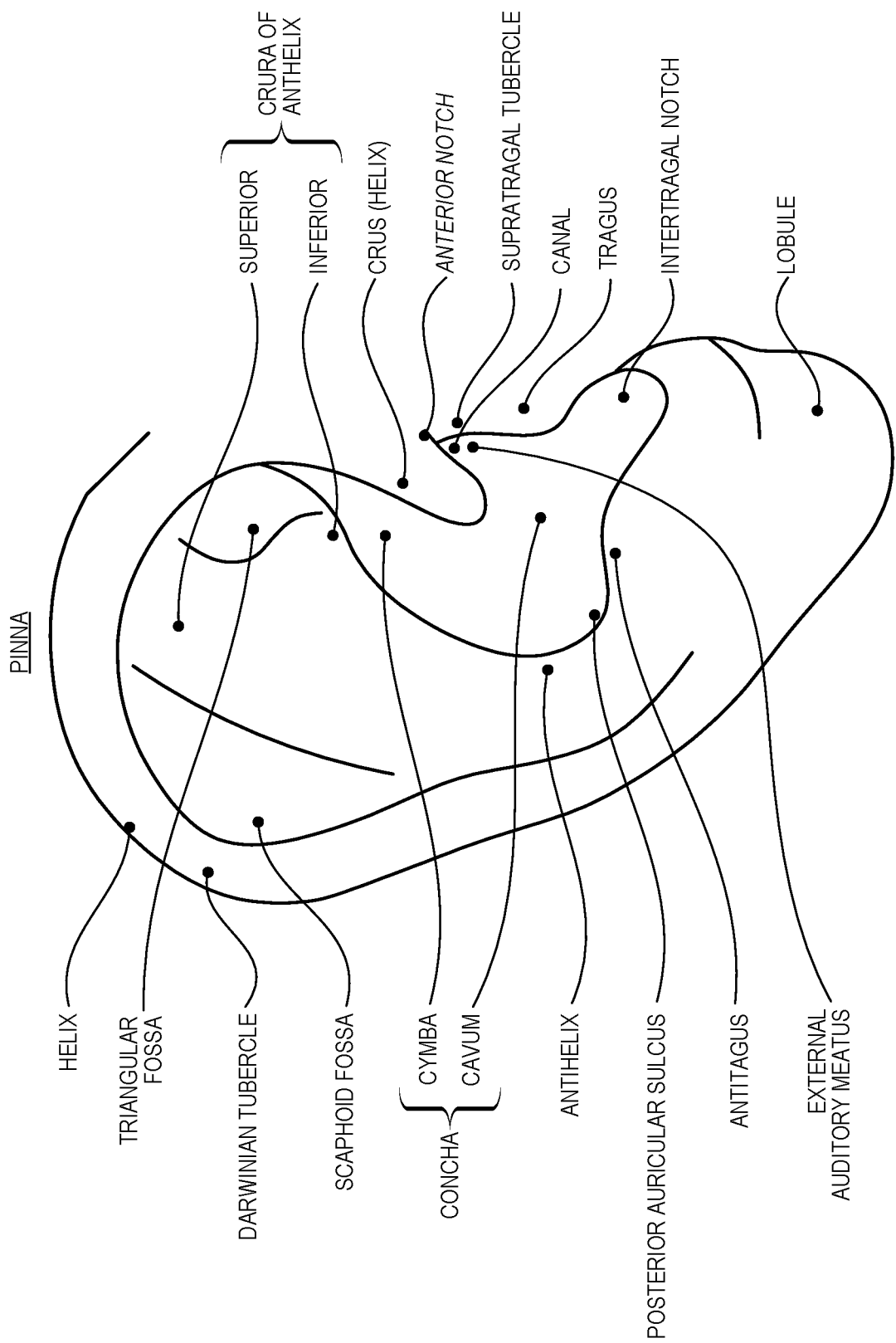
FIG. 1 is a cartoon illustration of human ear anatomy.

FIG. 1 is a cartoon illustration of human ear anatomy. The outer ear (i.e., pinna) anatomy depicted may be referenced in connection with how the in-ear device (see, e.g., FIGS. 2A and 2B) fits inside the ear. Shown are the location of the helix, triangular fossa, Darwinian tubercle, scaphoid fossa, concha (including the cymba and cavum), antihelix, posterior auricular sulcus, antitagus, external auditory meatus, crura of anthelix (both superior and inferior), crus, anterior notch, supratragal tubercle, canal, tragus, intertragal notch, and lobule.

Figure 2:
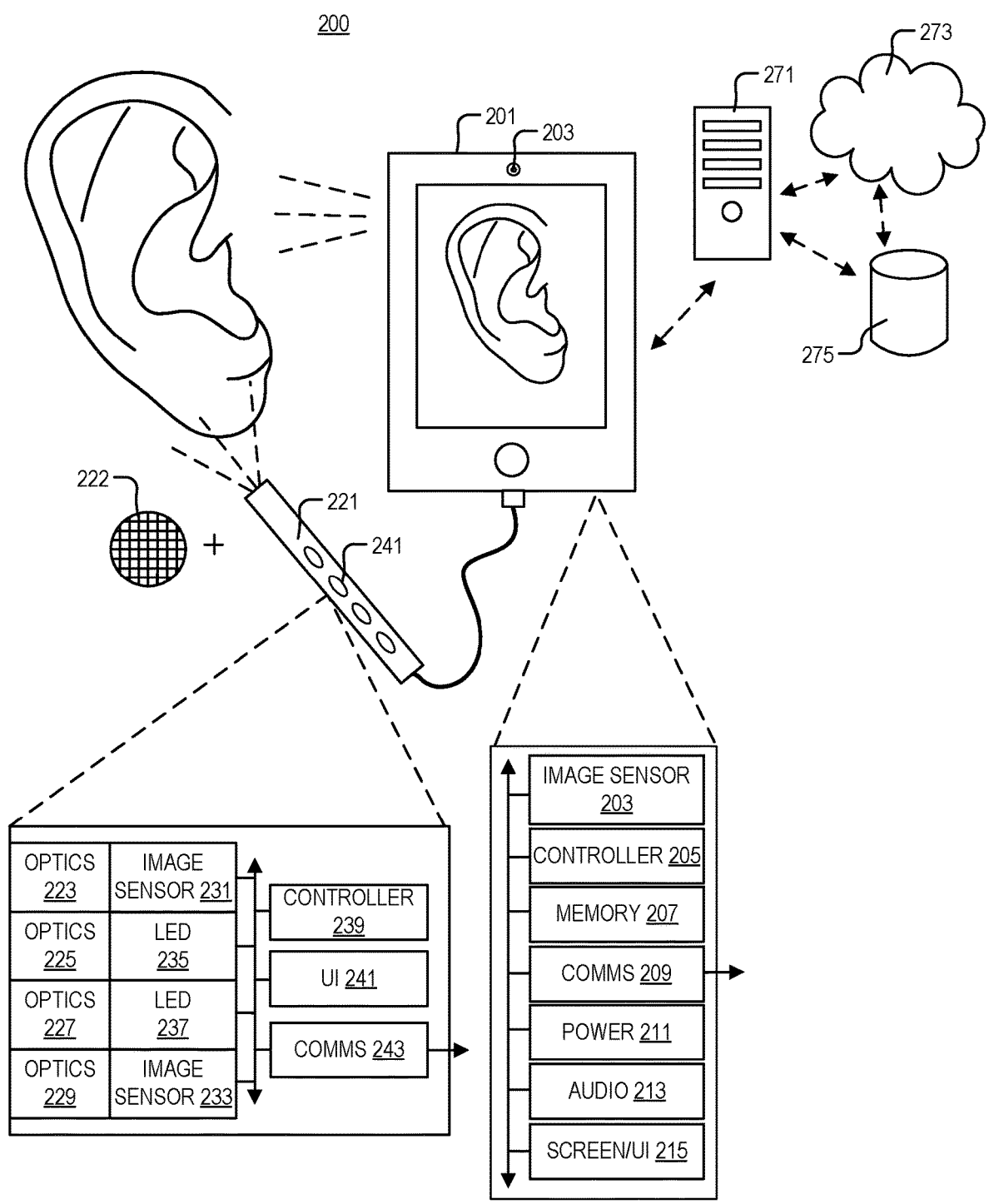
FIG. 2 illustrates a system to optically measure an ear, in accordance with an embodiment of the disclosure.

FIG. 2 illustrates a system 200 to optically measure an ear (e.g., the size and relative locations of some or all the anatomical components shown in FIG. 1), in accordance with an embodiment of the disclosure. Depicted are personal electronic device (PED) 201, and PED attachment 221. Remote servers 271 and storage 275 may be part of "cloud" 273 and coupled to communicate (e.g., by wires or wirelessly) with personal electronic device 201, and therefore attachment 221. Personal electronic device 201 (e.g., smartphone, tablet, personal computer, or the like) may include one or more image sensors 203 (e.g., one or more CMOS image sensors), controller 205 (e.g., general purpose processor, ASIC, a combination thereof, or the like), memory 207 (e.g., RAM, ROM etc.), communication circuitry 209 (e.g., wired or wireless transceiver like USB port, WiFi, Bluetooth, or the like), power supply 211 (e.g., charging circuitry, lithium-ion battery, etc.), audio input/output 213 (e.g., microphone and speakers), and a screen/UI 215 (e.g., touchscreen). All of these components are coupled by a bus.

Further in the depicted embodiment, PED attachment 221 may include optics 223/229 (e.g., one or more lenses, color filters, or polarizers to focus/filter/polarize light traveling into image sensors 231/233, respectively, from the ear), optics 225/227 (e.g., one or more lenses, color filters, or polarizers to focus/alter light output from LEDs 235/237, respectively), image sensors 231/233 (e.g., CMOS image sensors), light emitting diodes (LEDs) 235/237 (e.g., non-lasing diodes or lasers), controller 239 (e.g., general purpose processor, ASIC, a combination thereof, or the like), user interface (UI) 241 (e.g., one or more buttons 241 along the side of attachment 221), and communication circuitry (e.g., wired or wireless to communicate with PED 201). All of these components are coupled by a bus.

As shown, one more image sensors (e.g., image sensors 203 in PED 201, or image sensors 231/233 in PED attachment 221) are coupled to capture one or more images of the ear, and a controller (e.g., in PED 201, PED attachment 221, or across a distributed system including cloud 273) is coupled to the one or more image sensors. The controller includes logic that when executed by the controller causes the system to perform operations including: capturing the one or more images of the ear using the one or more image sensors (see e.g., image of ear on PED 201); generating image data from the one or more images; calculating 3D keypoints of the ear from the image data (see e.g., FIG. 3); and generating a 3D model of the ear using the 3D keypoints (see e.g., FIG. 3). The 3D model of the ear may be used to generate a custom fitting in-ear device (e.g., headphone, hearing aid, ear plug, or the like).

As illustrated the images may be captured with PED 201 itself or with PED attachment 221 or a combination thereof. Images captured may be 2D (flat) or may contain 3D information. In some embodiments, the images captured may have depth information provided either by parallax (e.g., cameras located a distance apart to triangulate distance); time of flight (e.g., light emitted from a light source such as LEDs 235/237 is reflected from the ear and the time for the light to travel from the ear and back, or the phase of the light, is used to calculate distance and produce 3D image data); dot projections (e.g., light dots projected onto the ear with LEDs 235/237, and the placement of the dots is used to calculate distance); or the like. As will be described in greater detail later, in some embodiments, 2D images/image data may be put into a convolutional neural network (CNN) or other machine learning algorithm to determine depth information.

In the illustrated embodiment, the user may take photos with either PED 201 or PED attachment 221. To take photos with PED 201 the user may hold PED 201 and use the front self-facing image sensor 203 or the back-facing image sensor to image their ear/head. The user may move PED 201 into several locations to capture enough images to generate an accurate 3D model of the ear. Similarly, the user may hold PED attachment 221 and use it to image some, or all, of the ear. It is appreciated that images from PED 201 and images form PED attachment 221 may both be used to form the 3D model. As shown, since PED attachment 221 is substantially "wand" shaped with LEDs 225/227 and image sensors 231/233 being disposed at the distal tip, PED attachment 221 may be better at imaging the interior of the ear since its cameras can fit into, and see inside, the contours of the concha and canal. Thus, the user may scan their inner ear with the wand and capture images. Also as shown, there may be multiple image sensors 231/233 disposed a distance apart from one another to provide parallax information. The user may interact with and adjust the lighting conditions (e.g., brightness, color, dot projection) or image acquisition conditions (e.g., frame rate, imaging mode, etc.) using buttons/user interface 241 disposed on the sides of the wand, or through an application running on PED 201.

In some embodiments, the user may be prompted by an application or the like running on PED 201 to take specific pictures of the ear. For example, the user could download an application for imaging the ear to create custom headphones. The application could instruct the user to take one picture of their ear from a few feet away (e.g., to show the whole pinna), then the application could instruct them to take images closer to the ear that show the contours of the concha and canal. In another example, the app could prompt the user to take video of their ear, and prompt the user to move the camera around in a circular pattern (or the like) to oversample the ear (e.g., since the video contains hundreds or thousands of frames). Then the frames (images) from the video that best show different angles of the ear can be used to form the 3D model. The best frames may be automatically selected when using a machine learning algorithm or other techniques (e.g., thresholds that only select images with the right saturation, color, or the like).

In the depicted embodiment, PED attachment 221 draws power from PED 201. However, in other embodiments PED attachment 211 may not be wired to PED 201, and may include its own battery and charger. In some embodiments, PED attachment 211 may be mailed to the user to capture images of their ear, and then the user mails back PED attachment 211 after they have received a custom molded in-ear device they are satisfied with. Alternatively, PED attachment 221 may be a very inexpensive one-time-use device.

In some embodiments, PED attachment 211 may also include one or more filters/gratings 222 to alter the light output from PED attachment 221. Filter/grating 222 may clip on the end of PED attachment 221 to create a light speckle pattern on the ear to help gauge distances in the figures. Alternatively or additionally filter/grating may filter light so only certain wavelengths reach the ear, or polarize light, etc. In some embodiments, filter/grating 222 may clip onto the light source (e.g., flashlight) that is contained in personal electronic device 201. Thus, the user only needs an inexpensive grating/filter 222 that clips onto their smartphone or tablet's flashlight to produce a dot projection with a specific wavelength of light (e.g., grating/filter 222 may include a red filter and a grating to produce a red dot projection when light is directed at the user's ear). It is appreciated that 3D information contained within 2D images (e.g., a speckle pattern) may make it easier for the machine learning algorithms to accurately perceive distance in the image.

In the depicted example, controller 239, and PED 201, may be used to control the operation of the optical components in PED attachment 221. Controller may implement instructions input from the user to interact with PED 201 and user interface 241. In the depicted embodiment, user interface 241 includes buttons 241, however in other examples other communication techniques may be used. In one embodiment, communications circuitry 243 may be used to send and receive signals along the wire coupled to PED 201, or may include a wireless transceiver to send and receive signal to/from the PED 201 or other devices depicted.

As shown, communication circuitry 209 or 243 may communicate with one or more servers 271 and storage 275 which are part of the "cloud" 273. Data may be transmitted to the external devices from PED 201 or PED attachment 221, for example image data of the ear uploaded to the cloud for processing and generating the 3D model. Conversely, data may be downloaded from one or more external devices. For example, the 3D model, once calculated, may be downloaded with PED 201. Similarly, a confirmation email of an order for a custom pair of in-ear devices based on the 3D model may be received. The PED 201 and other remote devices may be used to interact with, and control, in-ear PED attachment 221 manually (e.g., through a user interface like an app) or automatically (e.g., automatic data sync). In some embodiments, the one or more external devices depicted may be used to perform calculations (e.g., calculating key points, and the 3D model), which may be processor intensive and send the results back to PED 201.

Figure 3:
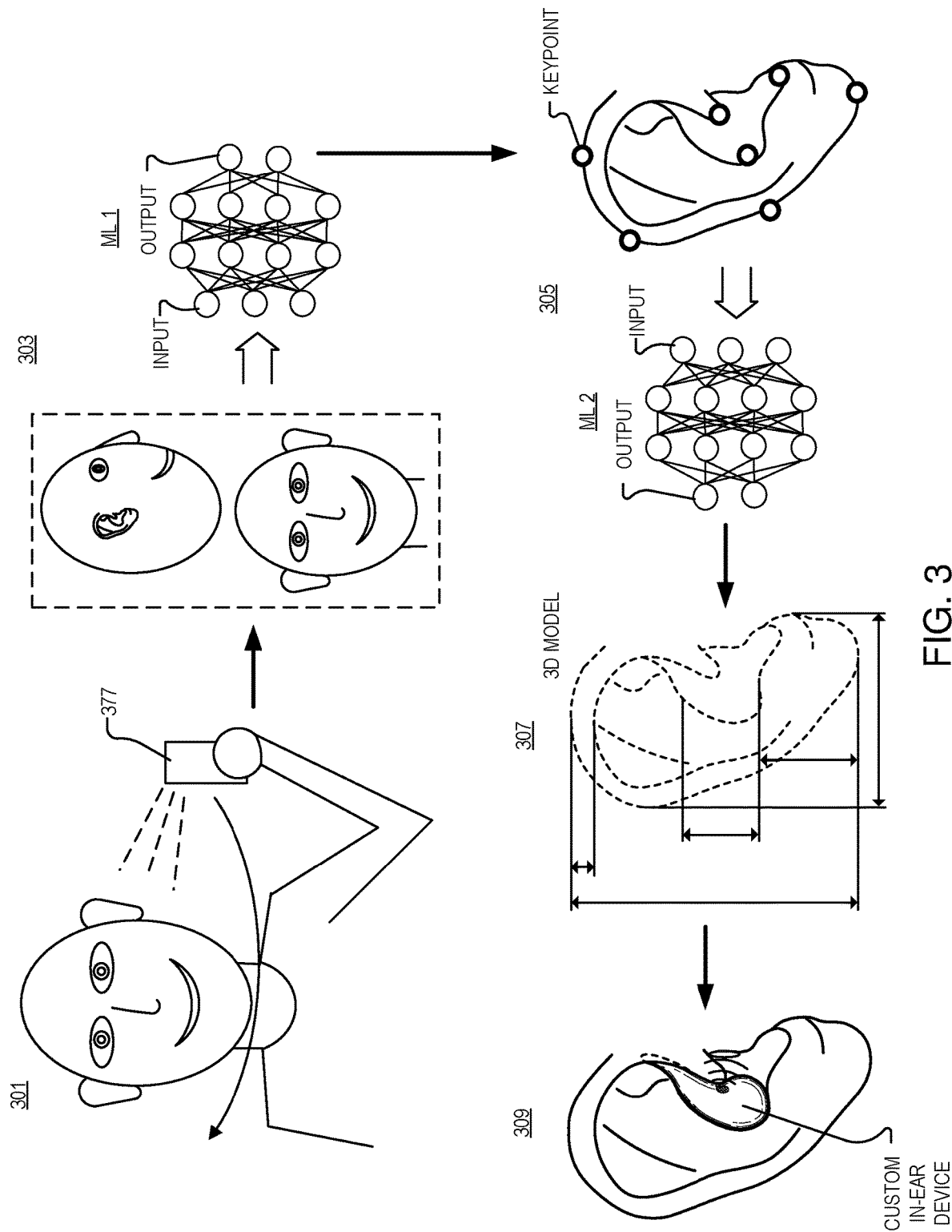
FIG. 3 illustrates a method and computer architecture to measure an ear which may run in/on the system of FIG. 2, in accordance with an embodiment of the disclosure.

FIG. 3 illustrates a method and computer architecture to measure an ear, which may run in/on the system in FIG. 2, in accordance with an embodiment of the disclosure. One of skill in the art will appreciate that the images 301-309 depicted are cartoon illustrations. For example, machine learning algorithms (ML 1 and 2) may have different structures than the neural net depicted. Moreover, the size and shape of images are not drawn to scale.

Image 301 depicts a user capturing one or more images (e.g., 2D images) of their head using the system depicted in FIG. 2. As shown above, capturing the one or more 2D images of the ear may be accomplished using one or more image sensors disposed in, or coupled to, a personal electronic device. The user may capture the images themselves or may have another person take the images. As stated, the user may be prompted by an app or the like to take a certain series of images to best capture the geometry of the ear. The image data that results from capturing the 2D images (e.g., from the pixels outputting their image charge) may then be sent to a local or remote processing apparatus (e.g., a controller in the personal electronic device or cloud).

Image 303 shows calculating 3D keypoints of the ear from the image data by inputting the image data (e.g., depicted as images of the user's head in the dashed-line box) into a first machine learning algorithm (ML 1) and outputting the 3D keypoints from the first machine learning algorithm. In the depicted example the machine learning algorithm is a geometric reasoning framework, which may include one or more convolutional neural networks (CNNs). In one embodiment, the geometric reasoning framework may be KeypointNet, an end-to-end geometric reasoning tool that is used to learn a set of 3D keypoints and their detectors. KeypointNet may take a single image and extract 3D keypoints that may be optimized for a task downstream. The KeypointNet tool may find geometrically consistent keypoints across many viewing angles and different objects in a category of objects (here, ears). Accordingly, after the KeypointNet tool is sufficiently trained on images of ears, it may be used to generate 3D keypoints of the ear.

Generally, when processing 3D data, features need to be selected from a small set of data points, usually called key points. This is because it is computationally complex to extract features from each point in the 3D data set—accordingly, there are fewer keypoints than actual data points in the 3D data set. Thus, a keypoint detector may be used to select interesting/unique points in the 3D data where descriptors are found. The keypoint detector determines the points of the 3D data set that are unique/interesting to allow for optimized object description, and correspondence with respect to point-of-view transformations.

Image 305 show generating a 3D model of the ear using the 3D keypoints by inputting the 3D keypoints into a second machine learning algorithm (ML 2) and outputting the 3D model (see e.g., image 307) from the second machine learning algorithm. The algorithm may be trained using data including actual measured 3D models of ears (obtained with informed consent). In one example the second machine learning algorithm includes a general adversarial network (GAN). In the depicted embodiment, the GAN architecture may include two neural nets that are pitted against each other: a generator to create new instances of data (e.g., 3D ear models) and a discriminator to evaluate if the generator has created an instance of the data that appears to belong to the training set. In some embodiments, the generator may be a type of deconvolutional neural network, while the discriminator is a convolutional neural network. In some embodiments, the various neural networks used my include collections of connected nodes, where each connection can transmit a signal from one node to another. The connections have weights, which are adjusted with learning. The weight increases or decreases the signal strength of the connection. In some embodiments, nodes may be aggregated into layers, and different layers perform different types of transformations on the input data.

Image 307 shows outputting the 3D model. The 3D model may be a point cloud (including measurements between each point), a wire frame model, or a database containing the coordinates of each data point in the 3D model. Thus, a highly accurate 3D model of the ear is achieved using hardware that many people already own, or with a small inexpensive attachment.

Image 309 shows using the 3D model to form at least part of an in-ear device that is custom shaped to fit in the user's ear. Depicted here, the device is a headphone that is held in the concha of the ear. Computing the custom-fit geometric surface of the device may be achieved by a computer program starting with a generalized shape (e.g., from an CAD file) for a headphone or headphone housing, and then the computer program adjusting the shape based on the 3D ear model (e.g., one surface of the device may be replaced with the 3D surface of the concha). In some examples, there may be certain critical dimensions that are not changed to accommodate hardware in the housing. In some examples, one surface of the in-ear device may derived from the 3D model and be the shape of the user's concha. In some embodiments, the 3D model of the ear may be used to generate a soft polymer mold to fit around a ridged in-ear device. The soft polymer mold (e.g., silicone) may be custom shaped, while the electronic components of device, and their housing, are not, thus allowing for maximum comfort while keeping fabrication of the hardware the same for each device.

Figure 4:
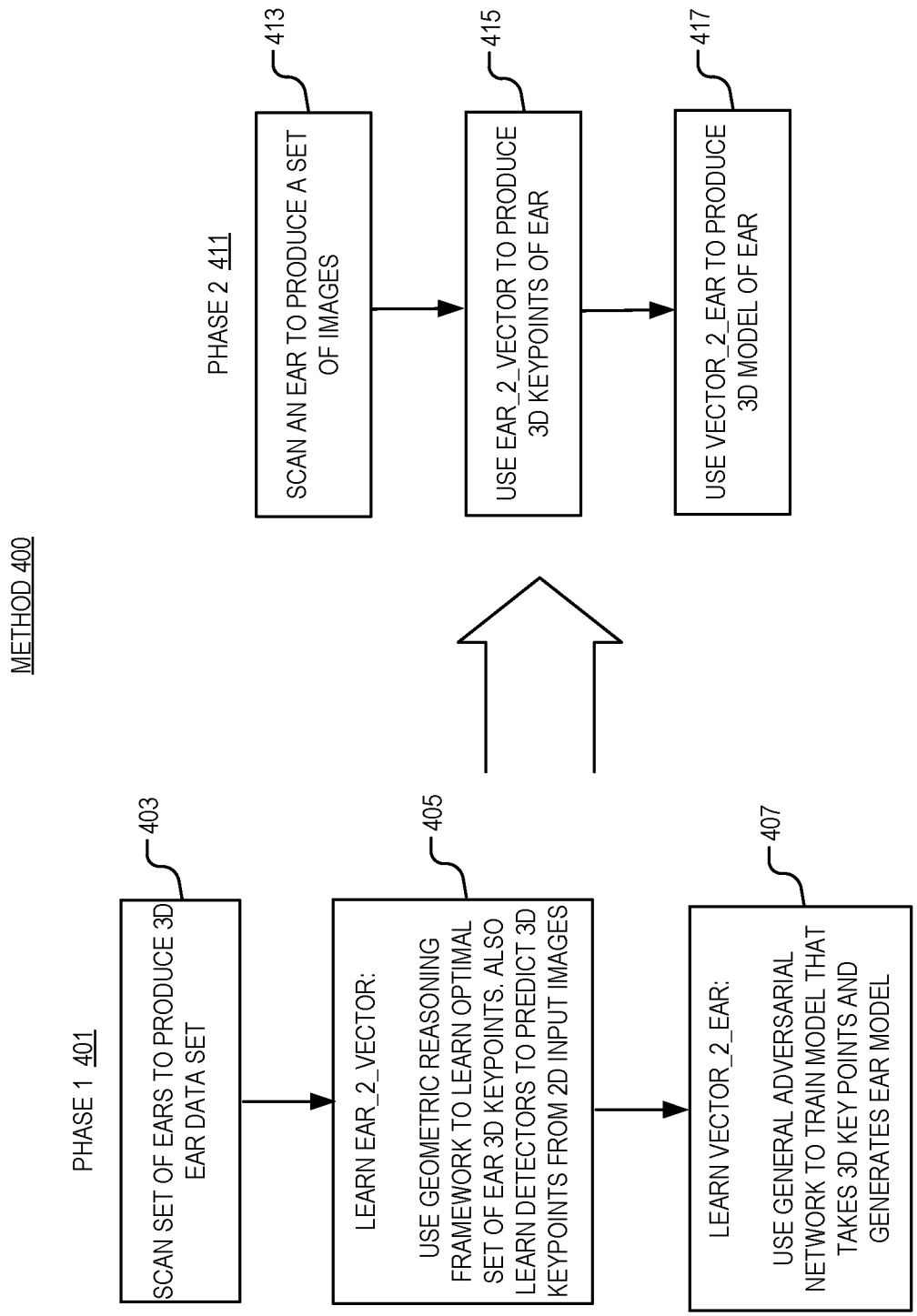
FIG. 4 illustrates two phases of a method for producing a 3D model of an ear, in accordance with an embodiment of the disclosure.

FIG. 4 illustrates two phases 401/411 of a method 400 for producing a 3D model of an ear, in accordance with an embodiment of the disclosure. One of ordinary skill in the art will appreciate that blocks 403-407, and 413-417 may occur in any order and even in parallel. Additionally, blocks may be added to, or removed from, method 400, in accordance with the teachings of the present disclosure. It is appreciated that phase one 401 occurs while training the machine learning algorithms that will be used to create 3D ear scans in phase two 411.

Block 403 shows scanning a set of ear 3D models. This may possibly include using expensive hardware (e.g., complex high-end otoscopes) to produce the 3D data set of ears. This data set will be used as ground-truth data to train the machine learning algorithms. The data may be manually altered to provide ultra-high quality training information.

Block 405 depicts training the first machine learning algorithm, "Ear_2_Vector". As stated above, KeypointNet (an end to end geometric reasoning framework) or a similar framework may be trained to learn an optimal set of 3D keypoints for an ear, along with their detectors to predict 3D keypoints from 2D input images.

Block 407 shows training the second machine learning algorithm "Vector_2_Ear". As described above, one or more generative adversarial networks (GANs) may be trained to take 3D keypoints and output the 3D ear model.

Once the machine learning algorithms have been trained in phase one 401, the algorithms may be used to produce 3D models of an ear for individual users (outside of a test setting).

Block 413 shows scanning an ear to produce a set of images. In some embodiments, a user may scan their ear with a video camera in their personal electronic device, and upload the image data included in the video to the cloud. The servers that make up the cloud receive and store this image data corresponding to the one or more 2D images of the ear.

Block 415 depicts using the trained Ear_2_Vector algorithm to produce the 3D keypoints of the ear. This may involve the servers calculating the 3D keypoints of the ear from the image data by inputting the image data into a first machine learning algorithm (e.g., "Ear_2_Vector") and outputting the 3D keypoints from the first machine learning algorithm.

Block 417 shows using the trained Vector_2_Ear algorithm to produce the 3D model of the ear. This may involve the servers calculating the 3D model by inputting the 3D keypoints into a second machine learning algorithm (e.g., "Vector_2_Ear") and outputting the 3D model from the second machine learning algorithm. As stated above, the 3D model may be used to form part, or all, of custom in-ear devices for the user (e.g. headphones, hearing aids, ear plugs, or the like).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system to optically measure an ear, comprising:
a controller including logic that when executed by the controller causes the system to perform operations including:
capturing one or more two-dimensional (2D) images of the ear using one or more image sensors;
generating image data from the one or more 2D images;
calculating 3D keypoints of the ear from the image data using a first machine learning algorithm, wherein the 3D keypoints include descriptive points in the image data that are less numerous than points in the image data;
generating a 3D model of the ear with a second machine learning algorithm using the 3D keypoints; and
generating a custom mold of at least part of a shape of an in-ear device based on the 3D model of the ear.

2. The system of claim 1, wherein the first machine learning algorithm includes a geometric reasoning framework.

3. The system of claim 2, wherein the geometric reasoning framework includes one or more convolutional neural networks trained on an image data set including ear images.

4. The in-ear device of claim 1, wherein the second machine learning algorithm includes a general adversarial network (GAN).

5. The in-ear device of claim 4, wherein the GAN is trained using 3D models of ears.

6. The system of claim 1, wherein the one or more image sensors are disposed in, or are coupled to, a personal electronic device.

7. The system of claim 6, wherein the controller includes a distributed system including one or more external devices separate from the personal electronic device.

8. The system of claim 7, further comprising a transceiver coupled to the controller to send and receive data including the image data, wherein the controller further includes logic that when executed by the controller causes the system to perform operations including:
sending the image data from the personal electronic device to the one or more external devices to generate the 3D model of the ear.

9. The system of claim 6, wherein the one or more image sensors are disposed in an attachment configured to couple to the personal electronic device.

10. The system of claim 1, wherein the first machine learning algorithm comprises a convolutional neural network (CNN) trained to generate 3D keypoints of the ear from the image data of the 2D images of the ear and the second machine learning algorithm comprises a general adversarial network (GAN) trained to generate the 3D model of the ear from the 3D keypoints output from the CNN.

11. A method, comprising:
capturing one or more 2D images of an ear using one or more image sensors;
generating image data from the one or more images;
calculating 3D keypoints of the ear from the image data by inputting the image data into a first machine learning algorithm and outputting the 3D keypoints from the first machine learning algorithm, wherein the 3D keypoints include descriptive points in the image data that are less numerous than points in the image data; and
generating a 3D model of the ear using the 3D keypoints by inputting the 3D keypoints into a second machine learning algorithm and outputting the 3D model from the second machine learning algorithm.

12. The method of claim 11, wherein calculating the 3D keypoints of the ear from the image data includes using a convolutional neural network.

13. The method of claim 12, wherein the convolutional neural network is included in a geometric reasoning framework.

14. The method of claim 11, wherein generating the 3D model of the ear using the 3D keypoints includes using a general adversarial network (GAN).

15. The method of claim 11, wherein capturing the one or more 2D images of the ear using one or more image sensors includes using a personal electronic device, wherein the one or more image sensors are disposed in, or are coupled to, the personal electronic device.

16. The method of claim 15, wherein capturing the one or more 2D images includes scanning the ear with a wand coupled to the personal electronic device, wherein the wand includes the one or more image sensors.

17. The method of claim 11, further comprising calculating at least part of a shape of an in-ear device based on the 3D model of the ear.

18. At least one machine-accessible storage medium that provides instructions that, when executed by a machine, will cause the machine to perform operations comprising:
  receiving image data, corresponding to one or more 2D images of an ear, from a personal electronic device;
  calculating 3D keypoints of the ear from the image data by inputting the image data into a first machine learning algorithm and outputting the 3D keypoints from the first machine learning algorithm, wherein the 3D keypoints include descriptive points in the image data that are less numerous than points in the image data; and
  generating a 3D model of the ear using the 3D keypoints by inputting the 3D keypoints into a second machine learning algorithm and outputting the 3D model from the second machine learning algorithm.

19. The at least one machine-accessible storage medium of claim 18, wherein calculating 3D keypoints of the ear from the image data includes using a geometric reasoning framework.

20. The at least one machine-accessible storage medium of claim 18, wherein generating the 3D model of the ear using the 3D keypoints includes using a general adversarial network (GAN).

21. The at least one machine-accessible storage medium of claim 18, further providing instructions that, when executed by the machine, will cause the machine to perform further operations, comprising:
  calculating at least part of a shape of an in-ear device based on the 3D model of the ear.

22. The system of claim 6, wherein the personal electronic deVice includes a light source to output light for illuminating the ear when capturing the one or more 2D images with the one or more image sensors, the system further including:
  a filter adapted to attach to the personal electronic deVice over the light source and which is configured to generate a speckle pattern with the light output from the light source to aid at least one of the first or second machine learning algorithms with perceiving depths in the one or more images.

23. The system of claim 22, wherein the filter includes a wavelength filter that generates the speckle pattern in a specified color.

* * * * *